Figure 1:
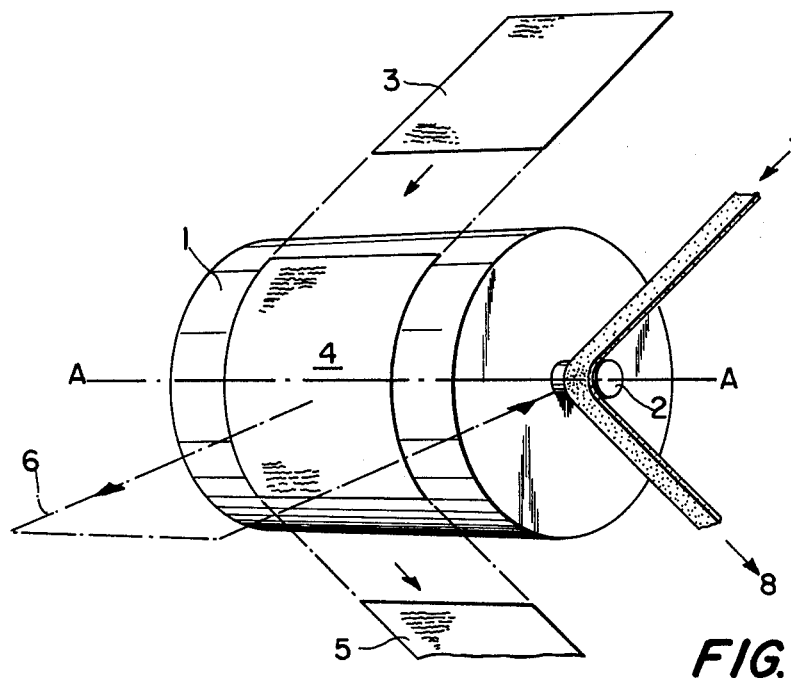

United States Patent [19]

Harrison et al.

[11] 4,110,037

[45] Aug. 29, 1978

[54] DOCUMENT RECORDING MACHINES

[75] Inventors: Peter Arthur Harrison; Anthony John Parks; Malcolm Dennis Southgate, all of Bury St. Edmunds; William Derek Sleath, Thetford; Richard Keith Hills, Bury St. Edmunds, all of England

[73] Assignee: W. Vinten Limited, Bury St. Edmunds, England

[21] Appl. No.: 751,017

[22] Filed: Dec. 16, 1976

[30] Foreign Application Priority Data

Dec. 17, 1975 [GB] United Kingdom ............... 51678/75

[51] Int. Cl.$^2$ ....................... G03B 27/48; G03B 27/50
[52] U.S. Cl. ........................ 355/48; 355/51; 355/64
[58] Field of Search ................ 355/47–51, 355/64, 18

[56] References Cited

U.S. PATENT DOCUMENTS

| 2,521,951 | 9/1950 | Schubert | 355/48 |
| 2,627,203 | 2/1953 | Hessert | 355/48 |
| 3,010,361 | 11/1961 | Pfaff | 355/51 X |
| 3,539,257 | 11/1970 | Hoyne et al. | 355/49 X |
| 3,547,535 | 12/1970 | McLean et al. | 355/49 |
| 3,861,799 | 1/1975 | Chiswell et al. | 355/64 |

Primary Examiner—Richard A. Wintercorn
Attorney, Agent, or Firm—Larson, Taylor and Hinds

[57] ABSTRACT

A document recording machine of the flow camera type wherein the rotatable document carrying drum is co-axial with the film carrying capstan and having the same angular velocity, an optical reduction system having the same relative reduction as the reduction of peripheral movement of the drum and capstan and a further optical system for recording a serial number from a film carrying magazine to the film and a pivotable mirror in the further optical system is operable to alternately break the two optical paths.

9 Claims, 4 Drawing Figures

U.S. Patent  Aug. 29, 1978  Sheet 1 of 2  4,110,037

DOCUMENT RECORDING MACHINES

This invention relates to recording machines and more particularly, though not exclusively, to the type of recording machine more generally used for the purpose of assimilating documentary information on a medium such as a continuous film, in either cassette or magazine, and generally known as the flow or rotary camera type.

Machines of this type are known, and it is an object of this invention to provide a design of machine in which the retrieval of information is improved and wherein the synchronisation of film advance with document advance is improved.

It is also an object of this invention to provide a machine having a constant exposure control whilst at the same time providing a cheaper and more easily interchangeable light source.

One of the main problems associated with these types of machines is synchronising film advance with that of document advance as the transport roller, or rollers, is usually of the continuously rotating type and film transport is clutched, either mechanically or electromechanically, by mechanism operated by the feeding of a document into the machine. This method is generally used as a means of conserving film and to ensure that as many exposures as possible, per film length, are achieved. It is, therefore, necessary to synchronise the rate of advancement of film with the rate of advancement of a document or documents to be copied. In order to achieve a good standard of synchronisation all backlash in gear trains and/or slipping of drive belts must be eliminated. With continuous drive virtually no problem exists, but with intermittent drive machines wherein the film drive is clutched for engagement this backlash of gears and slip of belts causes numerous problems and the problems are generally amplified at slow speeds.

With the present invention, though the film drive is clutched to conserve film the problems of synchronisation are substantially eliminated as the film is driven directly on the axis of the document roller.

Another problem with existing machines is the difficulty of retrieving information relating to a specific document; as the documents are usually successively photographed onto film and generally a common magazine is used.

With the present invention each operator, though using the same recording machine, may have their own individual magazine or cassette, may also serial number, consecutively, their own series of documents and may therefore more easily retrieve information on a particular document.

A further problem is the interchangeability of the illuminating means, which, in the majority of recording machines of the foregoing type is a tubular lamp, whether of the filament or fluorescent type. These types of lamp are seldom readily available at the time required as they are a specialised type of lamp.

With the present invention replacement or interchangeability of the illuminating means presents little or no problem as the illuminating means comprises one or more electric light bulbs of common household type and the illumination produced therefrom is maintained constant by an automatic voltage control circuit.

According to the invention we provide a machine for photographing a document or a series of documents or a continuous document onto a continuous film said machine comprising:

a rotatable drum for reception and transportation of said document, series of documents or continuous document, through a photographing station, one or more finger bars operable by said document, series of documents or continuous document to actuate sequencing means, clutch means engageable with drive means of said rotatable drum and operable by said sequencing means, a co-axial shaft on, and drivable from said rotatable drum via said clutch means, a securely attached film magazine, removable from said machine, having a feed spool and take-up spool, wherein the take-up spool is driven from a friction drive coupled to said co-axial shaft, a capstan fixedly attached to said co-axial shaft and co-operable with the film of said film magazine to drive said film in co-operation with said take-up spool past an exposure station, means for illuminating said document, series of documents or continuous document, and, an optical system for transferring and reducing an image of said document, series of documents or continuous document from said photographing station to said exposure station, wherein the reduction of image is directly related to the reduction in peripheral movement of said rotatable drum and said capstan.

Figure 2:
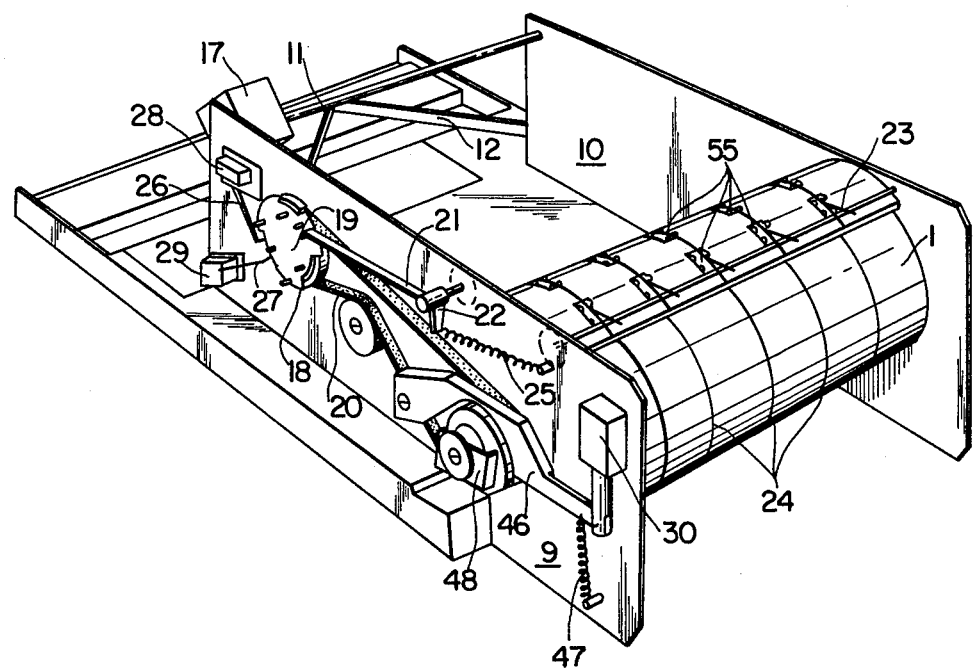
Figure 3:
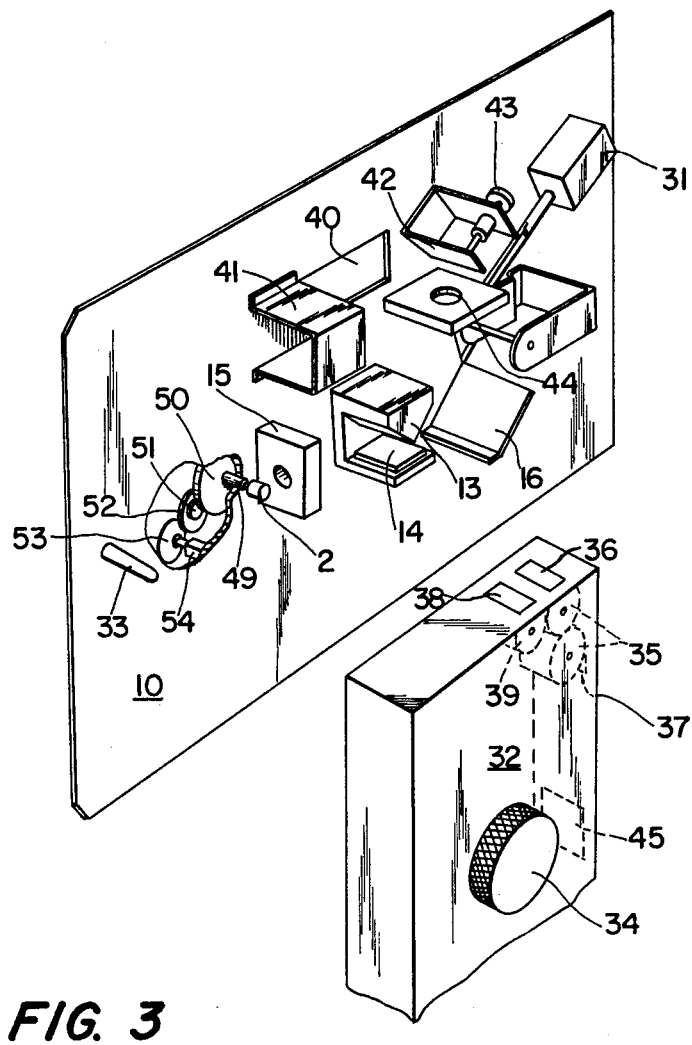
Figure 4:
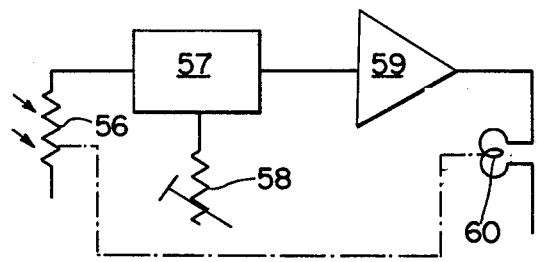

The invention will now be described, by way of example only, in conjunction with the accompanying drawings wherein like reference numeral indicate like elements and in which, FIG. 1 shows the basic principle FIG. 2 shows the basic machine with rotatable drum, FIG. 3 shows the secondary optical system, pivotable mirror, magazine drives and capstan, and FIG. 4 shows a circuit for determining the output of the illuminating means.

Referring first to FIG. 1 wherein the principle of operation is disclosed a rotatable drum 1 is rotatable on axis A—A and a capstan 2, which may be a part of the rotatable drum 1 or clutch driven from the rotatable drum 1, is on the same axis and rotatable at the same angular velocity as the drum. A document 3 when fed onto the rotatable drum rotates therewith and is retained in close contact therewith as at 4 by means to be described later, and is ejected as at 5. The document 3 whilst in close contact as at 4 is illuminated and an optical mirror system, to be described later, comprising suitable lenses and mirrors transfers and reduces the image of the document via path 6 to microfilm rotating on the capstan 2. The microfilm is preferably in a magazine or cassette into which the capstan 2 locates and unexposed microfilm 7 is fed from a feed spool, to and over the capstan where it is exposed and then the exposed film 8 is fed to a driven take-up spool, preferably friction driven so that the film may be tensioned over the capstan.

Referring now to FIG. 2 the rotatable drum 1 is rotatably mounted between side plates 9 and 10. Preferably the rotatable drum is coated with rubber or a like substance to assist transportation, of a document to be photographed, past a photographing station constituted by a transparent strip, not shown, in optical alignment with a first optical system and preferably in parallel alignment with the drum 1. The first optical system comprises mirrors 11 and 12 on FIG. 2, prism 13, mirror 14 and lens block 15 on FIG. 3. This first optical system is shown blocked on FIG. 3 by a pivotable mirror 16 which is operable in conjunction with a second optical system to be described later.

A motor 17 FIG. 2 drives, through suitable gearing, a drive wheel 18 attached to which is a cam 19 via a friction drive, so that the motor may drive the drive wheel 18 and hence the rotatable drum 1 via a belt 20 whilst at the same time the cam 19 may be held stationary by a pawl 21 on the end of a cam pawl shaft 22 which may be as shown and operable via linkage from a finger bar operated shaft, or may preferrably carry the finger bars 23. The finger bars 23 rest in peripheral slots 24 in the rotatable drum when no document is on the drum but are lifted out of their respective slots by the action of a document rotating with the drum, thereby rotating the cam pawl shaft 22 against the tension of a spring 25. Rotation of the cam pawl shaft 22 lifts the pawl from the cam 19 which comprises two sets of three stop pins on different radii so that the inner set of stop pins arrest cam rotation when the finger bars 23 are seated in the perpheral slots of the rotatable drum and the outer set arrest cam rotation when the finger bars 23 are lifted from the peripheral slots 24 by the action of a document passing onto the rotatable drum. As the finger bars 23 are lifted the pawl 21 releases the cam 19 to permit rotation thereof, thus allowing microswitch operating arm 26 to ride out of a cam recess, and on further rotation, microswitch actuating arm 27 to ride out of the recess, operating microswitches 28 and 29 respectively as the operating arms ride to the top of the cam. Preferrably friction between cam 19 and drive wheel 18 is adjustable. Operation of microswitch 28 energises the document illuminating means and operation of microswitch 29 energises solenoids 30 and, referring to FIG. 3, 31.

A magazine or cassette 32 locatable over spigot 33 and lockable by a Dzus (Registered Trade Mark) type clip, controlled from knob 34, contains microfilm for reception of an exposure of the document and a suitable loop forming device also operable from knob 34 to ensure that correct location of film is obtained over the capstan 2, as the magazine 32 is located. Contained in the magazine and resettable on loading the magazine with microfilm are two synchronised counters 35, visible from outside the magazine through two apertures 36 and 37. A film remaining indicator 38 may also be fitted and synchronised with the counters, so that the film remaining may also be noted from outside the magazine via an aperture 39.

On operation of microswitch 28 illumination of the document occurs and via aperture 40 and shroud 41 illumination of aperture 37 and the counters there displayed. These counters are photographed on the microfilm around the capstan in the magazine via a second optical path comprising mirror 42, which may be adjustable by screw 43, or may be fixed, secondary lens 44, pivotable mirror 16, prism 13, mirror 14, lens 15 and film gate 45.

Operation of microswitch 29 FIG. 2 energises solenoid 30 which lifts a capstan drive clutch brake 46 against the tension of a spring 47. Release of the capstan drive clutch brake 46 permits friction clutch 48 to drive the capstan 2 FIG. 3, via a drive shaft 49. A drive means, preferrably a gearwheel 50 drives a further gear 51 on the same shaft as, and fixedly attached to, an adjustable slipping clutch. Preferrably this takes the form of two adjustable clutch plates 52, one located each side of a clutch disc 53, so that clutch disc 53 rotates within pre-determined tension limits, to rotate a take-up drive means 54 for rotating the take-up spool in the magazine and tension the microfilm over capstan 2.

Operation of microswitch 29, as aforestated, also operates solenoid 31 FIG. 3 thereby lifting pivotable mirror 16, out of the first optical path and into a position below the secondary lens 44 to block the second optical path and permit photography of the document via the first optical path. The frame of microfilm therefore has exposed thereon a photograph of the document and adjacent the frame, a photograph of the counter so that the microfilm frame is serial numbered. As the two counters are synchronised, the serial number of the microfilm frame is also visible on top of the magazine at aperture 36 so that a record may be kept for retrieving information.

Referring again to FIG. 2 a series of spring loaded jockey wheel assemblies 55 rest on the rotatable drum 1 and guide the document 3 over the rotatable drum 1, as shown at 4, past the photographing station.

As aforestated operation of microswitch 28 energises the illuminating means.

Illumination of the document 3 and counter numerals 35 via aperture 37 may be by one or more common household type lamps controlled from a circuit such as shown in block form in FIG. 4. Referring to FIG. 4 a light sensitive detector 56 may be used to sense the general illumination or the reflected illumination from a document. The output of the light sensitive detector 56 is fed into a comparator 57 where it is compared with a pre-settable standard or reference 58 which may be related to such as a known density of document, rate of travel of document past the photographing station, type of microfilm in the magazine or other such parameters, or may be easily related to a combination of such parameters. The output signal from the comparator is fed to a phase controlled amplifier 59 whose output is fed to the lamp or lamps 60 as appropriate. The output of the illuminating means acts as its own feedback circuit to maintain constant illumination at the pre-determined setting.

We claim as our invention:

1. A machine for photographing a document, or a series of documents or a continuous document onto a continuous film said machine comprising:

a rotatable drum for reception and transportation of said document, series of documents or continuous document, through a photographing station, one or more finger bars operable by said document, series of documents or continuous document to actuate sequencing means, clutch means engageable with drive means of said rotatable drum and operable by said sequencing means, a co-axial shaft on, and drivable from said rotatable drum via said clutch means, a securely attached film magazine, removable from said machine, having a feed spool and take-up spool, wherein the take-up spool is driven from a friction drive coupled to said co-axial shaft, a capstan fixedly attached to said co-axial shaft and co-operable with the film of said film magazine to drive said film in co-operation with said take-up spool past an exposure station, means for illuminating said document, series of documents or continuous document, and, an optical system for transferring and reducing an image of said document, series of documents or continuous document from said photographing station to said exposure station, wherein the reduction of image is directly related to the reduction in peripheral movement of said rotatable drum and said capstan.

2. A machine as claimed in claim 1 wherein said clutch means is restrained from rotation by a drive clutch brake operable by a solenoid controlled from said sequencing means when no document is in the machine.

3. A machine as claimed in claim 2 wherein said removable film magazine further comprises one or more resettable counter mechanisms wherein at least one of said resettable counter mechanisms provides a numerical display for photographing.

4. A machine as claimed in claim 3 wherein a further optical system comprising a mirrors and lens system is incorporated for photographing said numerical display.

5. A machine as claimed in claim 4 wherein at least one mirror of said mirrors and lens system is pivotally mounted and is operable to obstruct said optical system during photography of said numerical display and breaks the path of said further optical system during photography of a document, series of documents or a continuous document.

6. A machine as claimed in claim 3 wherein said removable film magazine is interchangeable with one or more other securely attached, removable film magazines so that operators may have their own personal magazine for use on the machine.

7. A machine as claimed in claim 6 wherein the removable film magazines have a synchronised counter mechanism viewable externally of the machine for record purposes.

8. A machine as claimed in claim 5 wherein the sequencing means comprises a cam having stop means located thereon, operable by document location and operable to control switch means for selectively switching illuminating means, brake means and pivotal mirror means.

9. A machine as claimed in claim 5 wherein the output of the illuminating means is maintained at a pre-settable degree of illumination.

* * * * *